No. 647,378. Patented Apr. 10, 1900.
S. C. DARROW.
SHIPPING CRATE FOR FISH.
(Application filed May 4, 1899.)
(No Model.)
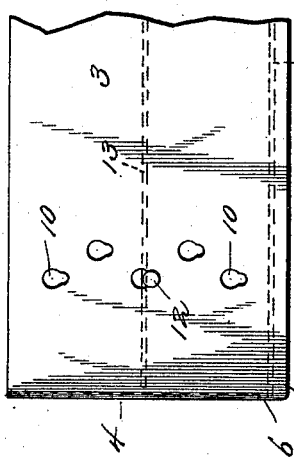
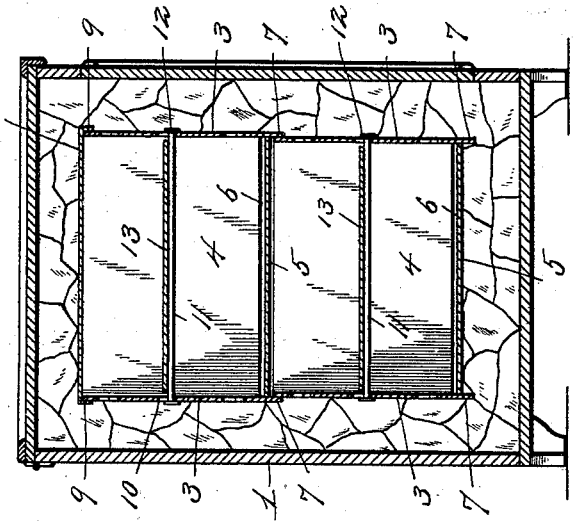
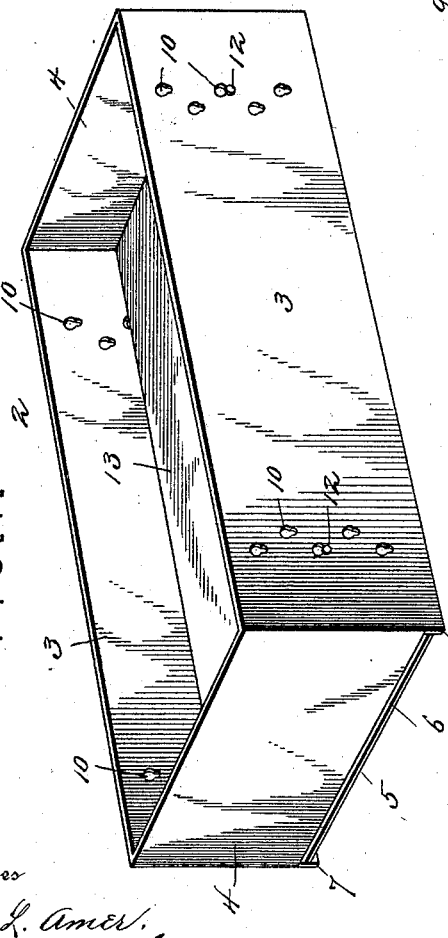
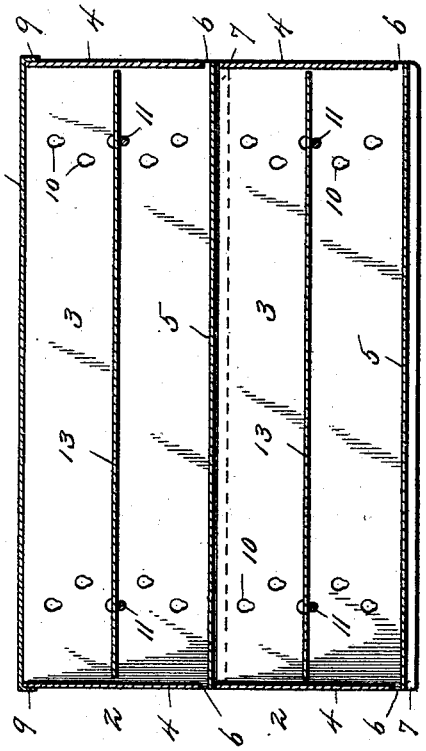
Witnesses
Harry L. Amer
Refrod M. Smith
Inventor
Samuel C. Darrow.
By V. D. Stockbridge
Attorney
THE NORRIS PETERS CO., PHOTO-LITHO., WASHINGTON, D. C.

UNITED STATES PATENT OFFICE.

SAMUEL C. DARROW, OF TRAVERSE CITY, MICHIGAN.

SHIPPING-CRATE FOR FISH.

SPECIFICATION forming part of Letters Patent No. 647,378, dated April 10, 1900.

Application filed May 4, 1899. Serial No. 715,593. (No model.)

*To all whom it may concern:*

Be it known that I, SAMUEL C. DARROW, a citizen of the United States, residing at Traverse City, in the county of Grand Traverse and State of Michigan, have invented a certain new and useful Shipping-Crate for Fish, of which the following is a specification, reference being had therein to the accompanying drawings.

This invention relates to crates; and it is especially designed for shipping fresh fish and preserving the same while in transit.

The primary object of the invention is to keep the fish in separate layers and prevent them from becoming too closely packed by reason of their weight, at the same time enabling them to be subjected to the cooling influence of ice, which may be packed around the fish without coming in actual contact therewith. By means of the improved shipping-crate the fish may be forwarded to any reasonable distance and kept in first-class condition. Provision is also made for drainage from the compartments in which the fish are placed and for readily regulating the thickness of the layers according to the kinds of fish being packed and shipped.

The detailed objects and advantages of the invention will appear more fully in the course of the subjoined description.

The invention consists in certain novel features and details of construction and arrangement of parts, as hereinafter fully described, illustrated in the drawings, and incorporated in the claims.

In the accompanying drawings, Figure 1 is a perspective view of one of the crate-sections with the cover removed. Fig. 2 is a longitudinal section through a plurality of crate-sections, showing the manner in which the same are nested together, with a cover applied to the uppermost section. Fig. 3 is a side elevation of a portion of one of the crate-sections, showing the arrangement of openings for the reception of the supporting-rods. Fig. 4 is a vertical cross-section through an ice box or receptacle, showing the manner of arranging the crate-sections therein and packing the same with ice.

Similar numerals of reference designate corresponding parts in all the views.

Referring to the drawings, 1 designates an ice box or receptacle, which may be constructed of wood or other suitable material and which may be of any desired size to receive a number of crate-sections, the said box or receptacle being designed to contain cracked ice, which is filled in between the crate-sections, as hereinafter described. Within the ice box or receptacle are arranged the crate-sections, and as they are all counterparts one of the other it will only be necessary to describe one of the sections. Each section is in the form of a rectangular box or receptacle, as shown at 2, comprising parallel sides 3, ends 4, and bottom 5. The bottom 5 is connected along its longitudinal edges permanently to the sides 3, and its ends are disconnected from the ends of the box, so as to leave drainage slots or openings 6. The sides 3 are also extended below the bottom 5 to form depending flanges 7, designed to fit over and embrace the sides of the next lower crate-section, as clearly shown in the drawings, thus enabling the sections to be placed one upon the other and to so engage each other as to prevent relative lateral movement or the sliding of one section from off the other. A cover 8 is applied to the uppermost section, said cover having a surrounding flange 9, which fits upon the outside of the upper edge of the uppermost section, so that ice may be placed upon the section and the tiers of sections covered with ice without the ice coming in contact with the fish. Each of the sections is provided in its opposite sides with oppositely-arranged openings 10 for the reception of supporting-rods 11, removably fitted in said openings. Each of the rods is double-headed or provided with button-shaped heads 12 at its opposite ends, the rods being slightly longer than the width of the box, so that the heads extend outside of the box or crate section. The openings 10 are preferably of keyhole shape or made tapering, so that their lower ends are smaller than their upper ends, the upper ends being sufficiently large to admit of the passage of the heads 10 of the rods 11, while the lower portions of the slots or openings are approximately equal in diameter to the diameter of the rods placed therein. The rods are inserted in the openings, so that the heads pass through the enlarged portions thereof, whereupon by lowering the rods they engage the narrow portions of the slots, and the heads 12 prevent longitudinal movement and escape of the rods in a manner that will be readily understood. The openings 10 may also be arranged in several vertical rows or in staggered form, as shown in the drawings, so that the height of the rods may be accurately adjusted so as to regulate the depth of the layer of fish. The rods 10 are arranged at or near each end of the box, and each pair of rods is adapted to support a shelf or division-piece 13. The crate-sections 2, together with the cover 8 and shelves or division-pieces 13, are preferably composed of metal, although any suitable material may be employed. Instead of making the slots or openings 10 in keyhole form they may be made of triangular form, so that the rods will bind and be securely held in the narrow ends of the slots.

The crate-sections are piled or nested one upon the other and arranged in tiers or vertical series in the ice box or receptacle and covers placed upon the uppermost sections. The ice-box is then filled and packed with ice, so that the ice bears against the sides and ends of all of the crate-sections. If desired, a layer of ice may first be placed in the box to form a rest upon which the crate-sections are placed, and the several tiers of sections may also be covered with ice, the latter resting upon the covers 8 of the several sections. In this manner the fish do not come in contact with the ice and do not become too closely packed, as the division-pieces divide up the weight and keep the fish in separate layers. It will also be seen that the thickness of the layers of fish may be regulated by adjusting the heights of the several shelves or division-pieces. It will also be observed that all of the sections are self-draining and that they are locked against relative lateral displacement by means of the depending longitudinal flanges extending along the bottoms thereof.

I do not desire to be restricted to the exact details of construction and arrangement hereinabove described, but reserve the right to change, modify, or vary the details of construction within the scope of this invention.

Having thus described the invention, what is claimed as new, and desired to be secured by Letters Patent, is—

1. A sectional shipping-crate comprising box-shaped sheet-metal sections provided with openings through the opposite walls near the ends thereof, said openings having reduced lower ends and being arranged in staggered relation to each other, adjustable double-headed rods insertible through oppositely-arranged pairs of said openings, the heads of the rods being adapted to engage the outer surfaces of the sides, and adjustable shelves resting upon said rods, substantially as specified.

2. A sectional shipping-crate comprising box-shaped sheet-metal sections, each having its sides extended below the bottom to form pendent flanges adapted to engage an adjoining lower section, end walls terminating above the bottom to leave drainage-openings above the plane of the bottom, the side walls being provided with openings through the same having reduced lower ends and arranged in staggered relation, adjustable double-headed rods passing through oppositely-arranged pairs of said openings with their heads engaging the outer surfaces of the side walls, and adjustable shelves resting upon said rods, substantially as and for the purpose specified.

In testimony whereof I affix my signature in presence of two witnesses.

SAMUEL C. DARROW.

Witnesses:
C. W. ASHTON,
O. P. CARVER.